United States Patent [19]

Ellison

[11] 4,164,323

[45] Aug. 14, 1979

[54] BRACING ATTACHMENT FOR WHEELED SPRINKLER SYSTEM

[76] Inventor: Manuel Ellison, Star Route, Milford, Calif. 96121

[21] Appl. No.: 814,265

[22] Filed: Jul. 8, 1977

[51] Int. Cl.² ............................................ B05B 15/06
[52] U.S. Cl. .................................... 239/212; 137/344; 188/6; 239/276
[58] Field of Search ..................... 188/6; 239/177, 212, 239/276; 137/344; 248/49, 73, 74 R

[56] References Cited

U.S. PATENT DOCUMENTS

| | | | |
|---|---|---|---|
| 2,766,996 | 10/1956 | Jacoby | 239/212 X |
| 3,071,327 | 1/1963 | Cornelius | 239/212 |
| 3,684,180 | 8/1972 | Gorzell | 239/212 |
| 4,006,860 | 2/1977 | Cornelius et al. | 239/212 |

FOREIGN PATENT DOCUMENTS 978565 11/1975 Canada .................................. 239/212

*Primary Examiner*—James B. Marbert
*Assistant Examiner*—Andres Kashnikow
*Attorney, Agent, or Firm*—Lothrop & West

[57] ABSTRACT

Pivoted 180° apart on the periphery of a sprinkler wheel, a pair of arms can be swung from folded position within the compass of the wheel to unfolded or operative position whenever it is necessary to immobilize the wheel. The distal end of the arms carries a foot plate with spikes, enabling the operator to force the spikes into the ground with foot pressure. In the operative position, the arm pivots are located on a horizontal diameter of the wheel and the arms are inclined downwardly at an angle of 45° for effective holding effort.

2 Claims, 3 Drawing Figures

BRACING ATTACHMENT FOR WHEELED SPRINKLER SYSTEM

BACKGROUND OF THE INVENTION

The market place as well as the patent literature are replete with various types of devices for selectively immobilizing, or bracing, at least some of the wheels of a wheeled sprinkler system used in irrigating agricultural crops.

Exemplary are the following U.S. Pat. Nos.
Jacoby : U.S. Pat. No. 2,766,996
Cornelius : U.S. Pat. No. 3,071,327
Gorzell : U.S. Pat. No. 3,684,180
Cornelius et al : U.S. Pat. No. 4,006,860
and Canadian Pat. No. 978,565 to Williams.

There is, however, considerable room for improvement.

Jacoby's anchor arm 20 is not hinged and exceeds in length the diameter of the wheel so that even if it were hinged it would protrude beyond the periphery of the wheel in folded position.

Cornelius' arm 14 is pivoted but, as in Jacoby, the arm length precludes its being folded to a position within the compass of the wheel.

Gorzell's feet 21 and 22 are foldable into the wheel but the mechanism involved is rather complex and costly.

In Cornelius et al, the arms 164 and 166 are folded substantially into axial alignment with the pipe but the construction of the elongated arms and the moderately complex pivot structure necessarily adds a substantial amount to the cost of the sprinkler system on which they are installed. Similar remarks apply to the Williams device.

SUMMARY OF THE INVENTION

The invention relates to bracing devices for selectively immobilizing certain of the wheels in a wheeled sprinkler system used to irrigate agricultural crops.

Attached to the selected wheels are braces comprising two pivoted arms which can be swung between a first, inoperative position within the compass of the wheel and a second, operative position in which the two arms located 180° apart extend outwardly and downwardly at approximately 45° from the wheel into engagement with the ground. A foot plate carrying spikes on the ends of the arms enhances the anchoring effort.

DESCRIPTION OF THE PREFERRED EMBODIMENT

Figure 1:
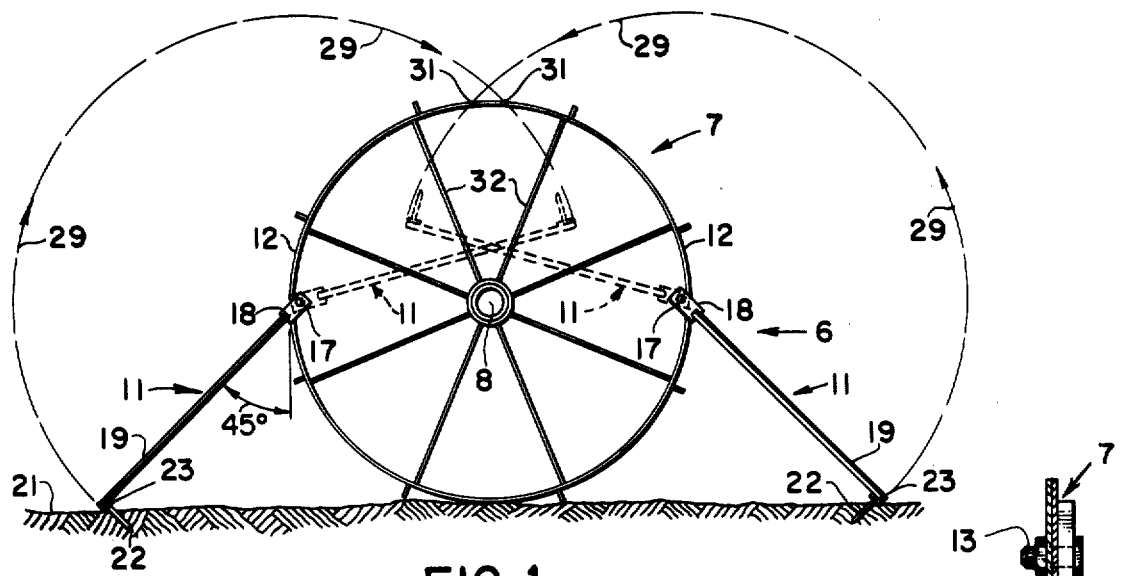
FIG. 1 is an elevational view of a sprinkler system wheel having a preferred embodiment of the invention installed thereon, the bracing arms in unfolded, or operative, position being shown in full line and in folded, or inoperative, position in broken line.
Figure 2:
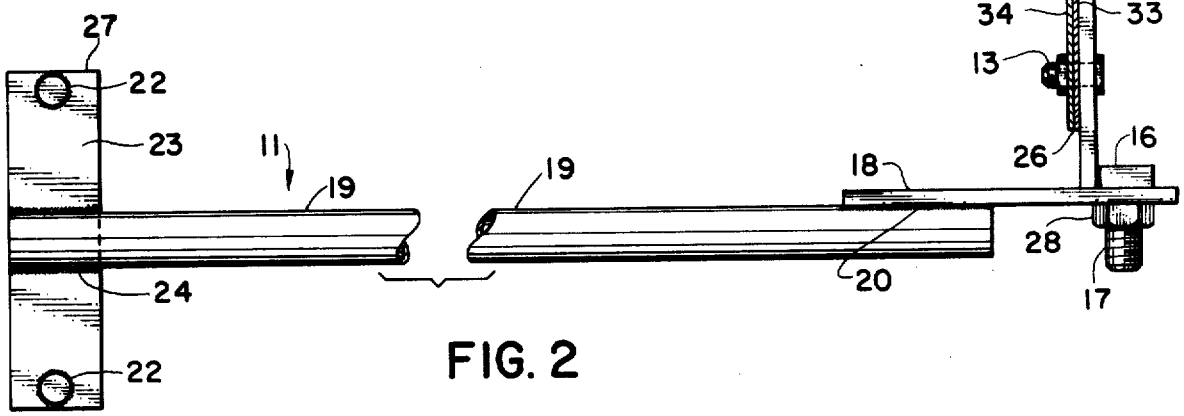
FIG. 2 is a top plan view, of a bracing arm to an enlarged scale, a portion being broken away to reduce the extent of the figure; and, FIG. 3 is a side elevational view of the bracing arm of FIG. 2.

While the bracing attachment of the invention is susceptible of numerous physical embodiments, depending upon the environment and requirements of use, substantial numbers of the herein shown and described embodiment have been made, tested and used, and all have performed in an eminently satisfactory manner.

The bracing attachment of the invention, generally designated by the reference numeral 6, is installed on a conventional wheel 7 of the type used in an agricultural sprinkler system, the wheel 7 being mounted in customary fashion on a pipe 8 connected to a long line of similar pipes which receive water from a suitable source and disperse the water through a plurality of sprinkler heads (not shown) mounted in upright attitude on the pipes.

It is often desirable to immobilize the sprinkler system. For example, in flat terrain subject to winds of high velocity, sprinkler systems, especially when empty, and thus light in weight, have been known to roll considerable distances under wind forces blowing in a direction conducive to such action. The components of the sprinkler system in such cases have often collided with fences, trees, outbuildings or other structures with consequent damage, often of a serious nature.

So also, it is frequently necessary after moving a line of pipes to rotate individual wheels so as to bring the sprinklers adjacent the wheels into vertical attitude and to hold them in such attitude.

Furthermore, when irrigating on a hillside, it is often necessary to brace the wheels of a sprinkler system against rolling downhill.

The bracing attachment 6 achieves the foregoing objectives in an economical, straightforward fashion by pivotally securing to the periphery of the wheel 7 a pair of arms 11 swingable between a first, unfolded, operative position indicated in full line in FIG. 1 and a second, folded, inoperative position shown in broken line in FIG. 1.

Each of the arms 11 is identical to and is located in mirror symmetry with respect to the other. A description of one arm will therefore serve to describe the other.

Mounted on the periphery 12 of the wheel 7, as by a pair of threaded fasteners 13, is a steel bar 14 having welded thereto at one end the square head 16 of a bolt having a threaded stem 17. The long dimension of the bar 14 is parallel to the rotational axis of the wheel.

The stem 17 serves as a pivot pin for a pivot plate 18 to which an elongated tube 19 is welded, as at 20. The pivoting aspect is controlled by a nut 28 associated with threaded stem 17. The combined length of the plate 18 and the tube 19 is such that when the arm 11 is in unfolded position, the arm is inclined outwardly and downwardly from the pivot at about 45°, as shown in FIG. 1, thereby providing a very effective angle of resistance to movement.

Secure contact with the ground 21 is afforded by a pair of spikes 22 welded to a foot plate 23, welded at 24 to the distal end of the arm, allowing the user to exert a downward pressure on the spikes 22 sufficient to penetrate the ground the full length of the spikes.

Figure 3:
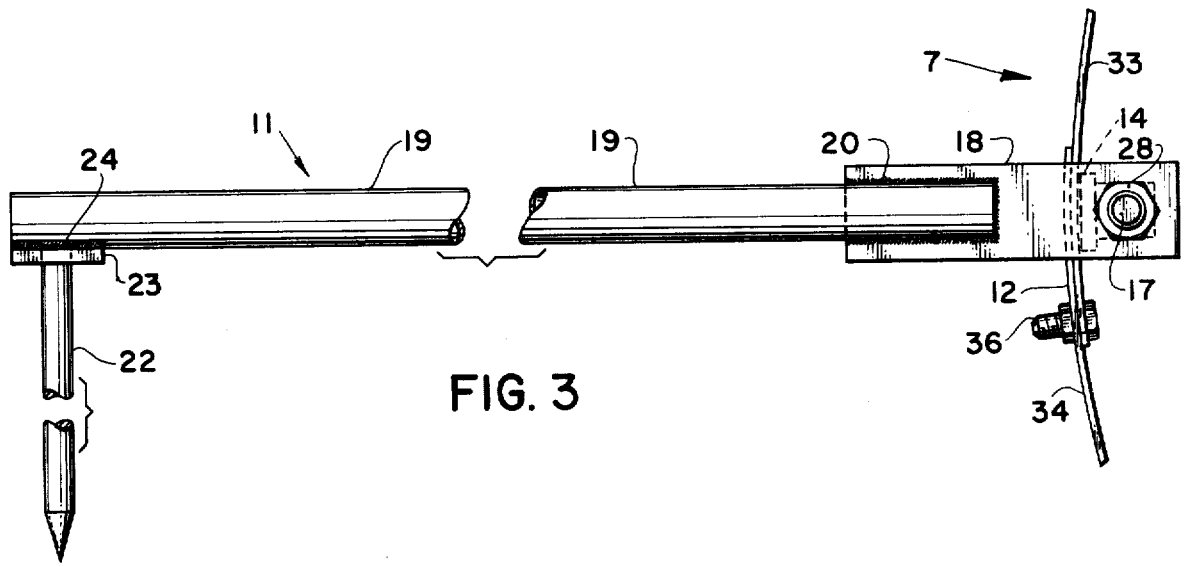

The wheel 7 is commonly constructed of two aluminum strips 33 and 34 bent into semi-circular shape and overlapped at their ends to form a full circle, as in FIG. 1. The two overlapping ends of the strips 33 and 34 are each secured not only by the two fasteners 13 but also by a pair of fasteners 36, only one of which is shown in FIG. 3. This arrangement disposes the two pivot stems 17 approximately 180° apart on the wheel as illustrated in FIG. 1; and the adjacent sprinkler heads, not shown, mounted on the water pipe 8 are in upright attitude when the two pivot stems 17 are in horizontal plane, as also appears in FIG. 1.

Thus, when a line of sprinklers is moved and arrives at its next location preparatory for sprinkling, the sprinkler heads adjacent the wheel 7 can be automatically positioned in the proper vertical posture by jockeying the wheel to or fro until the two pivots 17 are in a horizontal plane.

At this juncture, the two arms 11, which are located entirely within the compass of (i.e. within the imaginary envelope delineated by the periphery of) the wheel 7 are then swung upwardly and outwardly toward the operative position shown in FIG. 1. If the nuts 28 are tight, they are loosened sufficiently. As the arms approach the locations 31, the arms are manually swung away from the adjacent margin 26 of the wheel 7 so as to avoid interference therewith.

With the arms in unfolded, or operative, position, the operator steps on the footplates 23, causing the spikes 22 to penetrate the ground 21 and thus firmly anchor the arms in the ground at the desired angle of 45°, as illustrated in FIG. 1. The nuts 28 are then tightened.

At this juncture, the sprinkler heads will ordinarily be found to be in the desired vertical attitude. If some misalignment has occurred between the original sprinkler attitude and wheel position, such as might occur as a result of wear in the connection between the pipe 8 and the wheel 7, it is a simple matter to bring the sprinkler head to the correct upright posture by slightly shifting the wheel to or fro until the sprinkler is vertical and then pressing on the footplates to anchor the arms in place. Although both of the anchored arms 11 might not be precisely at 45° in this instance, the angle of the arms is still such as to afford a rigid brace capable of resisting high winds or any other forces tending to move the wheel 7 and attendant sprinkler system.

In order to return each of the arms 11 from the operative position shown in full line in FIG. 1 to inoperative position, the foregoing procedure is reversed. That is to say, the nut 28 is loosened and the spikes 22 are dislodged from the ground, as by lifting up on the bottom of the arm. The arm is then swung in the direction of the arrows 29, slightly swung outwardly in the vicinity of the location 31 and into inoperative position as shown in broken line in FIG. 1. The nut 28 can then be tightened, if desired. However, the interference between the edge of the wheel and the adjacent portion of the foot plate 23 at the location 31 serves to prevent inadvertent movement of the arm into a position outside the compass of the wheel which could seriously hamper moving the sprinkler line to its next location.

It can therefore be seen that I have provided a relatively simple, economical and fool-proof bracing attachment for an agricultural sprinkler system.

I claim:

1. A bracing attachment for an agricultural sprinkler system including a water pipe and a ground-supported wheel mounted thereon, said attachment comprising:

a pair of arms pivotally mounted at one end on the periphery of the wheel 180° apart on axes substantially parallel to the wheel axis, each of said arms including a tube extending from said one end to the other end a distance less than the diameter of the wheel and such that each of said arms subtends approximately a 45° angle with the vertical when said one ends of said arms are in a horizontal plane and said arms extend toward the ground, each of said arms further including a pair of spikes mounted on said other end capable of penetrating the ground under foot pressure exerted on said other end.

2. A bracing attachment as in claim 1 in which each of said arms includes a foot plate mounted on said other end transverse to the axis of said tube and in which said pair of spikes is mounted adjacent the lateral extremities of said foot plate.

* * * * *